United States Patent [19]

Bertoldo

[11] 4,409,872

[45] Oct. 18, 1983

[54] APPARATUS FOR FEEDING REINFORCING LAYERS IN TIRE MANUFACTURE

[75] Inventor: Giorgio Bertoldo, Arese, Italy

[73] Assignee: Societa' Pneumatici Pirelli S.p.A., Milan, Italy

[21] Appl. No.: 332,154

[22] Filed: Dec. 18, 1981

[30] Foreign Application Priority Data

Dec. 23, 1980 [IT] Italy .................................. 26899 A/80

[51] Int. Cl.³ .......................................... B29H 17/20
[52] U.S. Cl. ........................................ 83/155; 83/277; 83/422; 83/555; 156/405.1; 271/93
[58] Field of Search ...................... 83/155, 155.1, 422, 83/555, 277; 156/405.1, 406, 406.2, 406.4, 406.6; 226/93; 271/193; 198/690

[56] References Cited

U.S. PATENT DOCUMENTS

| | | | |
|---|---|---|---|
| 3,641,855 | 2/1972 | Balle | 83/171 |
| 3,654,828 | 4/1972 | Leblond et al. | 226/93 X |
| 4,288,265 | 9/1981 | Pacciarini et al. | 156/126 |

*Primary Examiner*—James M. Meister
*Attorney, Agent, or Firm*—Stevens, Davis, Miller & Mosher

[57] ABSTRACT

An apparatus for feeding elastomeric strips used to form an annular tread reinforcing structure of a vehicle pneumatic tire provided with reinforcing metal cords to a drum which forms the strips into the annular reinforcing structure is disclosed. The apparatus comprises an endless belt looped about spaced pulleys which transfers cut lengths of an elastomeric strip for making an annular tread reinforcing structure from bobbins of the strip to a drum which shapes an annular tread reinforcing member therefrom. The cut lengths of elastomeric strip are maintained in the desired position on the belt and drum by the action of two separate magnetic fields. One of the magnets is stationary and is placed under the belt. The other magnet is adjacent to the belt pulley nearest the drum. Apparatus is provided for laying automatically the two ends of the elastomeric strip on the belt.

13 Claims, 16 Drawing Figures

FIG.1A

APPARATUS FOR FEEDING REINFORCING LAYERS IN TIRE MANUFACTURE

This invention relates to an apparatus for transporting layers of elastomeric material to be assembled to form a tread reinforcing structure in the manufacture of vehicle pneumatic tires and, more particularly, to an apparatus for supplying in a continuous and automatic manner, metal reinforced elastomeric bands to a drum which forms an annular reinforcing structure therefrom. The tread reinforcing structure is disposed in a pneumatic tire between the tire carcass and the tread band.

A process for building up the carcass of a vehicle tire on a main drum and for assembling an annular reinforcing structure and a tread band on a second building drum, for disposing the unit formed on the second drum around a cylindrical carcass on the first drum, and then for expanding the carcass against the surface of the innermost reinforcing layer until it assumes a toroidal configuration, is already known.

Moreover, in such processes, methods are known for transporting the reinforcing layers reinforced with metal cords to the building drum.

For the most part, according to some methods, a conveyor belt is used to rotate around two pulleys, one of which is situated closely above the building drum in order that the operator may cut to size the reinforcing layer and then may apply by hand its ends under pressure on a revolving drum to wind the layer on the drum.

In general, this method has the disadvantage of having many costly steps which are to be carried out by hand.

Mechanical transport systems are already known for moving the elastomeric material from a supply thereof to the building drum. In these known systems, a series of conveyor belts are positioned side-by-side, each of which moves a strip of elastomer towards the drum which is disposed in an axial position across the axis of the various feeders.

This method has the drawback that the overall length of the required apparatus is so long that it cannot be adopted where the building drum during the winding of all the layers thereon is for any reason not movable, for example, when the groups of feeders are to be used with a building drum which is installed in a fixed position.

Moreover, it is to be noted that the ever increasing production output required in tire manufacture leads to the adoption of manual or mechanical steps which provide an ever increasing feeding rate of the reinforcing layers, with the risk that the terminal portions of less resistance in the elastomeric layer will become deformed. In fact, it is known that layers of a reinforcing structure which contain metal cords cut to size from a continuous strip have an end of reduced section due to the cut of the metal cords being inclined to some extent with respect to the mid-circumferential plane of the finished tire.

As can be understood, possible mechanical deformations or folds on the thinner layer ends introduce unacceptable disadvantages, because centering of the strip as it is wound on the drum is difficult and the metal cords of the resulting structure are not uniformly distributed in the resulting product.

Therefore, an object of the present invention is to provide an improved apparatus for feeding elastomeric strips reinforced with metal cords to a drum which converts the strips into an annular tread reinforcing structure for a vehicle pneumatic tire which is devoid of the foregoing disadvantages. Another object of the invention is to provide an apparatus for transferring from bobbins or other strip storage devices a plurality of metallic reinforced elastomeric strip cut to suitable lengths for assembly on a tire building drum into a tread band reinforcing structure to be disposed between the tread band and carcass of a vehicle pneumatic tire.

Other objects will become apparent from the following description with reference to the following drawing wherein.

The foregoing objects and others are accomplished in accordance with this invention, generally speaking, by providing an apparatus for transferring cut lengths of an elastomeric strip reinforced with magnetic metal cords or wires from bobbins, spools or other devices on which the strip is wound to a tire building drum where a plurality of strips are assembled and converted into an annular reinforcing structure to be disposed between a tire carcass and tread band in a vehicle pneumatic tire.

The apparatus provided by the invention is provided with a bobbin for each coil of strip material to be divided into one or more layers of reinforcing structure, a conveyor belt looped around two spaced pulleys one of which is disposed in proximity of the drum on which the reinforcing member is built, a cutting means for cutting the strip to length, the apparatus being characterized in that it has two distinct and independent fields of magnetic forces to draw and to maintain in a pre-established position the strips on the non-magnetic belt surface, the first magnet being disposed immediately under the surface of the upper reach of the belt between the two pulleys and being stationary with respect to movement of the belt, and the second maagnet being disposed where it exerts a magnetic field on the pulley disposed nearest to the drum.

As indicated above, the main features of the invention lie in the contemporary presence of two magnetic fields independent of each other, acting on an endless belt of non-magnetic material, for instance aluminium.

The first magnetic field, stationary and situated under the surface of the upper reach of the belt attracts the metal cords of the reinforced strip onto the conveyor belt and insures movement of the elastomeric layer with the belt from the cutting station towards the drum along a regular path, to become wound as a layer on the drum. The strip end is stretched and straightened to remove any folds or wrinkles in the strip and is aligned with the central part of the belt.

The second magnetic field which is associated with the downstream pulley nearest the drum, attracts the strip on the belt when the latter follows the curvilinear travel around the pulley surface before coming into contact with the drum, and insures therefore the correct and pre-established alignment of the whole strip and of its ends with the drum midline.

The favorable results obtained by the presence of the two magnetic fields, acting independently of each other, are quite evident in comparison with those afforded by a conveyor belt system containing magnetic elements embedded in its surface and moving together with the belt, such as a conveyor belt of conventional type made of magnetic material.

In that case the field of magnetic attraction is constant for the whole belt length and has a very high magnetic intensity or attraction, insuring the adherence between the strip and the belt also during the travel in which the strip would tend to straighten, along the curvilinear path around the pulley before the point of contact between the pulley and drum.

With that type of conveyor, owing to the intensity of the magnetic field, the operator encounters difficulties in correctly aligning the initial end of the strip on the belt, since the metal cords, even spaced a distance from the belt surface, are subjected to the attraction of the magnetic field and this disturbing phenemenon requires more accurate positioning steps, with longer times than those desirable for a feeding apparatus.

On the other hand, in a conventional belt having is own magnet, it is impossible to increase the diameters of the pulleys to avoid the risk of a possible straightening of the strip in its curvilinear travel and consequently to reduce the constant magnetic field, to eliminate the above difficulties for the operator.

In fact, if such a measure were taken, an apparatus intended to feed several reinforcing layers would have unacceptable dimensions.

As stated above, the presence of two independent magnetic fields in the apparatus according to the present invention overcomes the problems not solved by a conventional belt as described above. In fact, according to the invention, the magnetic field, which is stationary under the belt, can have moderate values with respect to those of the field associated with the rotating pulley nearest the drum, in order to insure a simple transfer of the strip to the position on the belt established by the operator.

The magnetic field disposed near the downstream rotating pulley can have a greater intensity with respect to those of the stationary field, for instance, more than double, because the magnetic attraction is already exerted on the metal cords belonging to the already laid layer and consequently disturbing phenomena of any kind do not take place, as it would be in the case of the initial laying of the end of the elastomeric band.

Moreover, it can be understood that the adoption of a magnetic field of high intensity, integral with the pulley, permits the advantageous elimination of any possible straightening of the reinforcing layer during the curvilinear travel of the belt around the pulley, and above all it is evident that the apparatus of the invention permits the use of pulleys of very small diameter, with a consequent reduction of the overall size of the various belts in apparatus intended to supply several strips to the drum.

It is still more evident that the positioning of the strips on the band is advantageously carried out without any tension or thinning out of the cords in the strips, as would take place, for instance, if the strips were guided towards the drum by direct contact of a pulley system.

Preferably, the apparatus is characterized in that it comprises between the belt and the bobbin a flat and stationary supporting structure on which the strip passes, the supporting structure comprising a groove in which the cutting means can travel for cutting the strip to size.

In its more general form, the apparatus may comprise reinforcing layers obtained by successively cutting the strip paid off from a bobbin into lengths, positioning of each cut strip on the belt being carried out by manual or mechanical means.

However, in the preferred embodiment, the apparatus is characterized in that it comprises means for the automatic mechanical alignment of the ends of the reinforcing layers with respect to the belt.

Preferably, the aligning means comprise pliers provided with a magnet capable of originating a magnetic field for lifting and transporting, alternatively, the two ends of the reinforcing layer on the belt, a truck to which the pliers are fast, a truck-driving system to move the pliers with a pre-establish alignment with respect to the belt, a locking device to associate the truck and the pliers with the moving belt, the locking device being situated downstream of the pliers with respect to the bobbin.

Figure 1A:
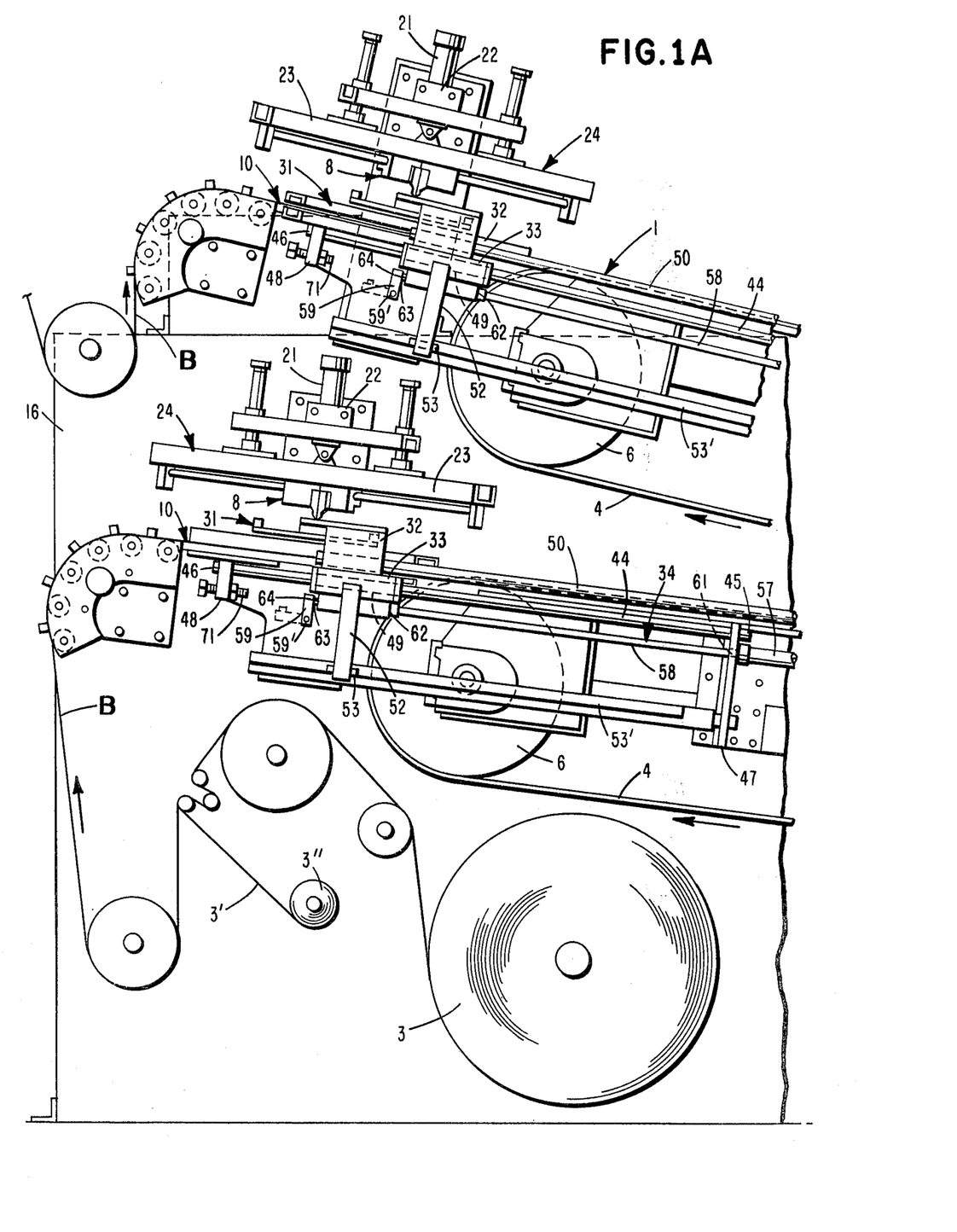
FIGS. 1A and 1B are a side view of one embodiment of a tire building apparatus having two transport conveyors associated with a drum for building an annular reinforcing structure for a pneumatic tire.
Figure 1B:
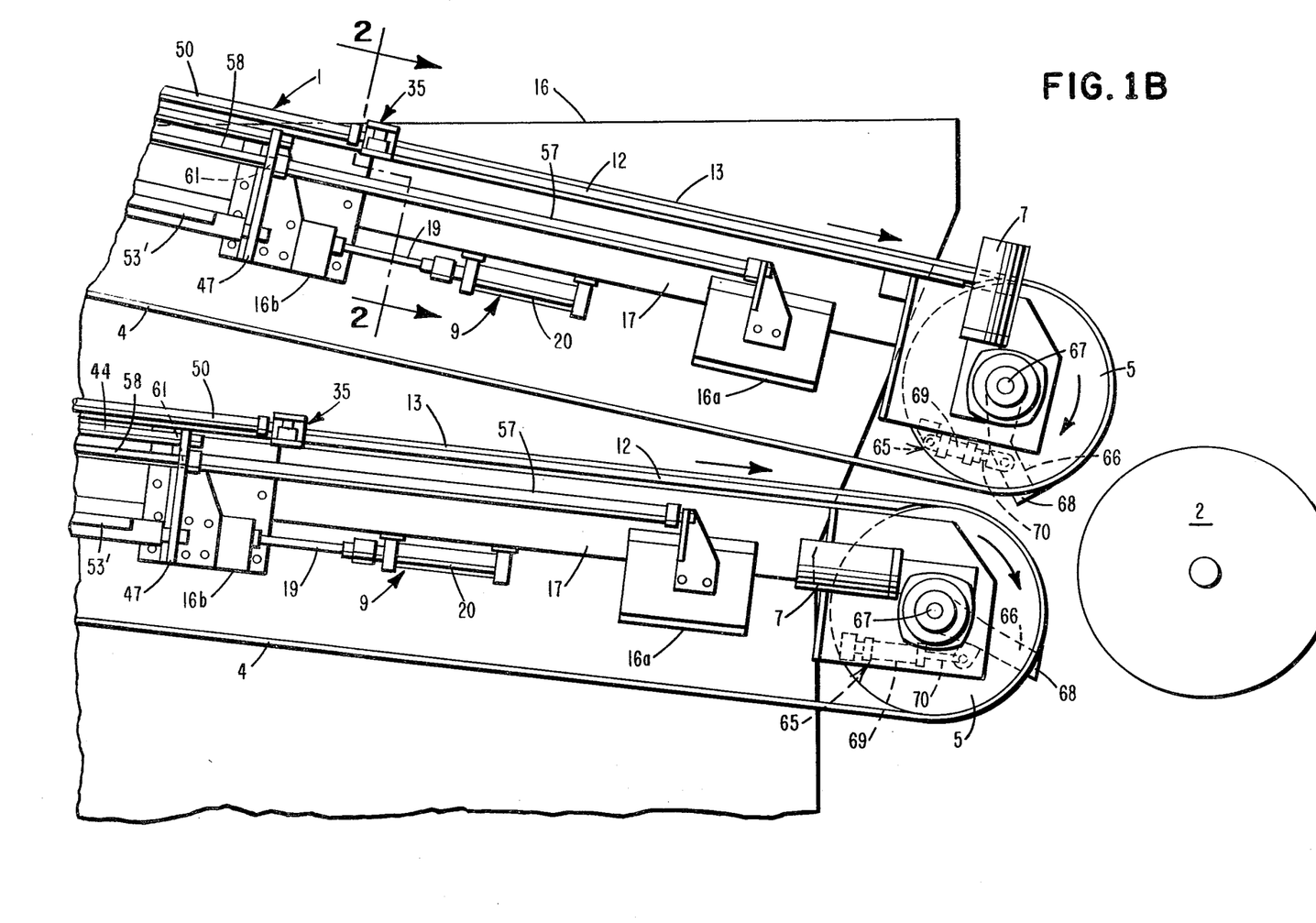

Referring now to the drawing, apparatus 1 (FIG. 1) is adapted to dispose elastomeric strips reinforced with embedded metal cords on a drum 2 used for forming a reinforcing structure from the strips which, in a radial tire, is sandwiched between the carcass and the tread band of the tire.

The drum 2 has a cylindrical shape with an outer layout equal in cross-section to that of the innermost reinforcing layer of the annular structure and can be of any suitable known type. By way of example and indication only, it can be of the type described in U.S. Pat. No. 4,288,265 issued Sept. 8, 1981, and pending application filed on Oct. 15, 1981, corresponding to Italian Application No. 25 340 A.80 filed Oct. 15, 1980, assigned to the assignee of this application, the disclosures of which are incorporated herein by reference.

For brevity's sake, it is here indicated only that drum 2 is of the so-called "comb" type described in the aforesaid application and patent, and is adapted to receive on its surface elastomeric strips reinforced with metal cords and to allow, between the hollow spaces of the comb, the expansion of a group of sectors from the inside to the outside of the comb in such a manner that the sectors may support the annular reinforcing structure and receive the tread band while the comb is shifted from the sectors in an axial direction. The drum is associated with a ring capable of transferring the annular structure and the tread band around a main expansible drum on which the shape of a tire carcass is converted from cylindrical to toroidal against the innermost layer of the annular reinforcing structure.

In order to simplify the description of the invention, reference will be made only to the deposit of the elastomeric strips from which the annular reinforcing structure is made on the drum 2, referring to the specifications of the aforesaid application and patent for the details concerning the other parts of the apparatus for manufacturing radial tires.

The apparatus 1 is of the type used to apply elastomeric strips as layers on a drum 2, which during operation, is maintained in a fixed position without any displacement along its axis of rotation. Moreover, in the described example, it is assumed that an annular reinforcing structure having only two elastomeric layers containing metal cords is to be made.

For each layer, the apparatus has a bobbin 3 around which is wrapped a continuous strip of elastomeric material reinforced with metal cords, to be divided into cut lengths after having the self-adherent polyethylene layer 3' removed therefrom and then collected around a pulley 3". A conveyor belt 4 is looped around longitudinally spaced pulleys 5, 6, one of which is connected to a motor-reducer 7 at one end and a cutting knife 8 at the opposite end for cutting the strip into lengths. A fluid actuated piston-cylinder device 9 is disposed between the upper and lower reaches of the conveyor 4 and between pulley wheels 5 and 6 for moving the conveyor belt 4 and the two pulleys 5, 6 towards the drum 2 until the belt, and therefore the strip thereon are brought into contact with drum 2.

A flat and stationary supporting structure 10, over which the belt 4 passes when in motion, is disposed between the bobbin 3 and the belt 4. The supporting structure 10 has a magnetic surface 10' (FIG. 5) and a groove 11 into which the cutter for cutting the strip to lengths slides.

Figure 2:
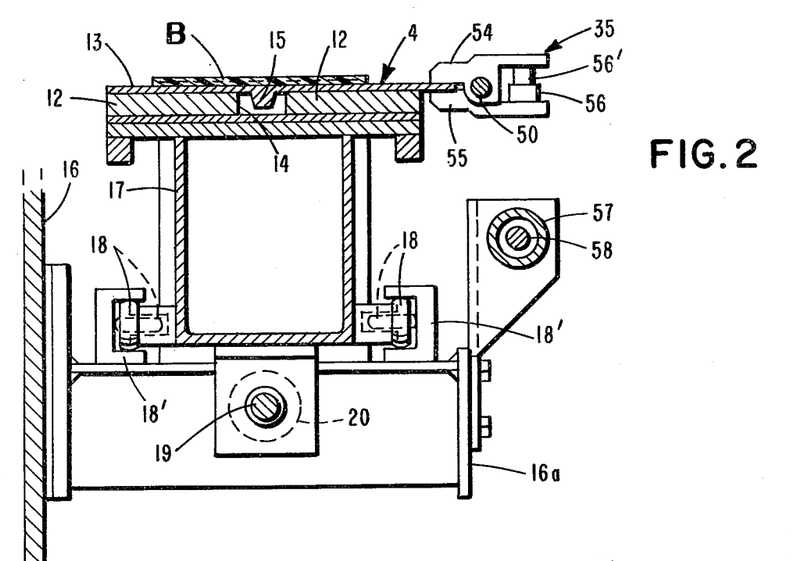
FIG. 2 is a cross section, taken along the line II—II of FIG. 1, of an endless conveyor on the separating frame of the apparatus.

According to the inventive principle, in order to guide correctly the elastomeric strip on the belt, two fields of magnetic forces for attracting the strip to the belt are provided; they are distinct and independent of each other, the one, stationary with respect to the belt movement, being formed by permanent magnets 12 arranged under the upper reach 13 of the belt 4 (see FIG. 2), and the other, rotating with the pulley 5, and formed for instance by magnetic material embedded in pulley 5. In particular, an aluminium pulley carrying on its periphery permanent magnets of any conventional type may be used.

The magnets 12 are disposed in two laterally spaced rows, with a longitudinal space 14 between the rows for passage of a tooth 15 (FIG. 2) associated, for the whole length of the conveyor, with the lower surface of the belt 4 to maintain the latter exactly centered with respect to drum 2. The permanent magnets have an attraction intensity selected as a function of the material forming the reinforcing layer. For example, as regards a strip having strands of the 1×4×0.25 formation, constituted by steel cords having a thickness of about 80, the permanent magnets have an attraction intensity of from 1 to 2 kg/dm$^2$. These magnets may begin to act at a distance of 7-10 mm.

The belt 4 may be made of any non-magnetic material such as non-magnetic stainless steel, for instance of the type known in the trade with the letter SR 60 (AISI 316) and, for the purpose of accurate centering of the strip, it was found advisable to maintain it at a very thin thickness, preferably between 0.4 and 0.6 mm. and to choose, for that belt thickness, a pulley diameter ranging between about 350 and about 600 mm., preferably about 500 mm.

The devices used to pay-off and to feed the two strips of elastomeric material to the drum are supported by a frame 16 having belts 4 and a supporting member 10 directed towards the drum 2 in a converging manner, as illustrated in FIG. 1.

In particular, each belt 4 with the relative pulleys 5, 6 is assembled on a U-shaped structure 17 (FIGS. 2, 4) extending longitudinally and associated with the frame 16 by means of a plurality of wheels 18 directed perpendicularly to one another in order to guide the travel of the U-shaped structure along appropriate tracks 18'; the movement of the U-shaped structure and of the thereto associated belt is due to the fact that the pressure cylinder 9 comprises a fluid-dynamic control (hydraulic or pneumatic) cylinder and piston assembly having a piston rod or stem 19 connected at its end to the frame 16, while cylinder 20 is supported by structure 17 (FIG. 1).

Figure 3:
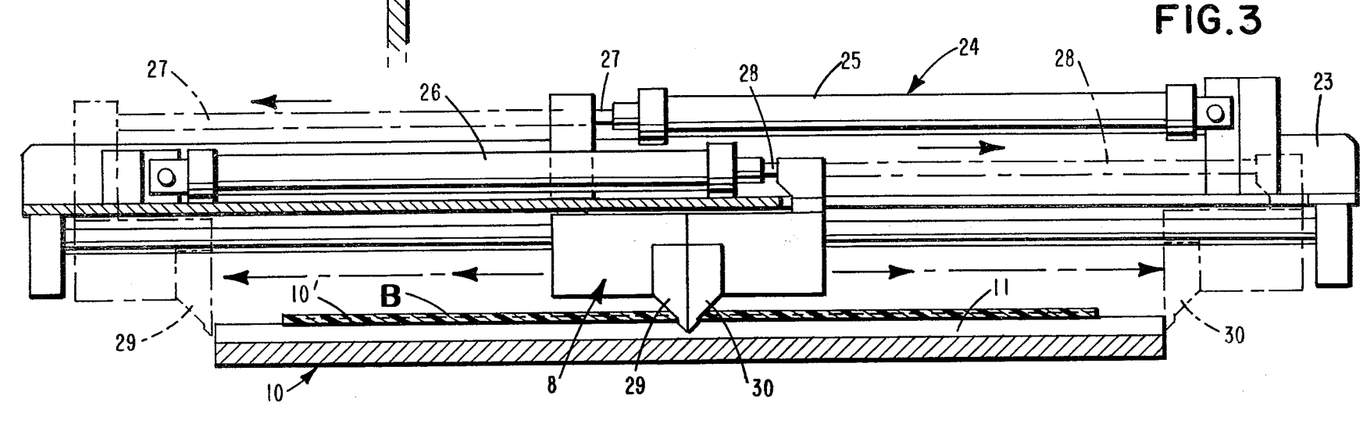
FIG. 3 is an enlarged detail, partially in section of one embodiment of the cutting device of the apparatus.

The cutting means, knife blades 29, 30 (FIG. 3) used to cut the size each strip coming from the bobbin 3, are associated upstream of the belts, supported by the same frame 16.

In the embodiment shown in FIG. 1, the cutting means comprise a fluid actuated piston having a cylinder 21 fixed to a supporting base member 22 of the frame 16 and a piston stem 23 directed perpendicularly to the supporting plane, which is connected to a cutting member 24 (FIG. 3) composed of hydraulic piston cylinders 25, 26 whose piston stems 27, 28 are connected to two cutting blades 29, 30, movable in a horizontal plane.

Cylinder 21 is actuated to enable the two blades 29, 30, arranged side-by-side, to cut in the center of the space between two metal cords of the reinforcing layer to be cut and the pistons in cylinders 25, 26 are actuated to move the two blades 29, 30 away from each other in the direction of the cords of the reinforcing layer for the formation of one end.

In the preferred embodiment, the apparatus 1 comprises alignment members 31 (FIG. 1) for aligning the two ends of each reinforcing strip cut to size on the conveyor belt 4.

The guide means 31, provided for each strip, are able to check the motion, the transport and the application of the narrowest portions of the strip, which are the most deformable, from the fixed surface of the support member 10 to the upper surface 13 of the belt 4 in motion. Means 31 can be various types; for instance, they can be metallic fingers or scissor-shaped levers adapted to grip opposite parts of the strip or they can be constituted by appropriate gripping surfaces having adhesive characteristics with respect of the strip.

Preferably, (FIG. 1), the aligning means comprise pliers 32 with magnets, for instance, in one embodiment, permanent magnets 32' (FIG. 6), a truck 33 to which the pliers are fixed, a truck-guiding system 34 to displace the pliers with respect to the belt with a pre-established alignment, a locking device 35 (FIG. 1) to associate the carriage, and therefore the pliers, to the moving belt.

The magnetic means are integral with a supporting plate 36, parallel to the belt (FIG. 6) and associated at its ends with a structure 37 fixedly connected in turn to the stem 38 of a fluid actuated piston slideably disposed in cylinder 39 fixed on frame 16'.

The pliers are so made that they can remove the magnetic field after laying the strip on the belt and therefore before lifting the pliers from the surface 13 of the belt 4.

In this connection, the two opposite surfaces 36, 37 of the pliers (FIG. 6) are spaced from each other and their ends are connected with hinge-shaped members in such a way that, by using particular means, it is possible to tilt at first one part and then the other of the surface 36, thus facilitating the detachment of the magnets from the strip on the belt.

These inclination means comprise two fluid actuated cylinders 40 supported on the structure 37 with their axes substantially parallel to the magnet supporting members 36 and with stems 41 hinged to levers 42 having fulcrums 42', whose ends 43 interfere with the end of the supporting member 36, (as it is visible in FIG. 6) transmitting forces directed upward and tending to move the supporting member 36 towards the structure 37.

Figures 5, 6:
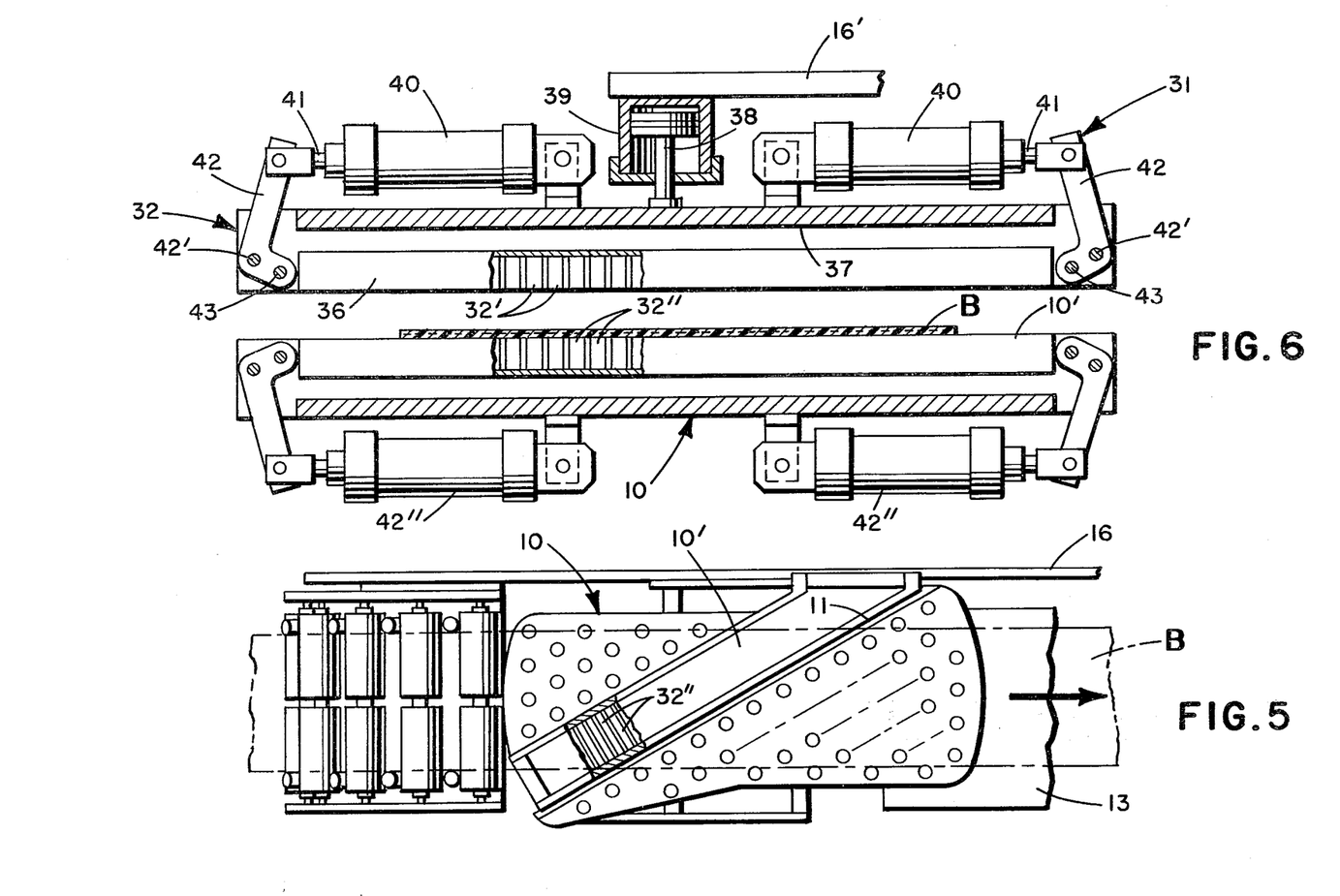
FIG. 5 is a plan view of the part situated below the pliers of the embodiment of the apparatus illustrated in FIG. 1.
FIG. 6 is a section of the pliers of the apparatus.

In the preferred embodiment visible in FIG. 6, the magnetic surface 10' of the supporting structure 10 is built up like the pliers 32, namely it comprises magnets 32" (see FIG. 5) which can be moved, as stated above, by means of fluid actuated cylinders 42".

The driving system 34 on which the truck slides comprises, (see FIGS. 1 and 4) a longitudinal bar 44 parallel to the belt transporting surface, having ends 45, 46 and secured to opposite flanges 47, 48 connected in their turn to the frame 16.

The bar 44 passes through a hole 49 of the driving truck 33 which is in turn secured, by means of a rod 50 (FIG. 1) parallel to bar 44 to a locking device 35 situated downstream of the pliers, considering the bobbin 3 as the starting point.

The locking device 35 clamps the belt 4 and therefore the strip, allowing consequently, with the belt motion, the travel of the truck along the driving bar 44 and the subsequent pulling of the second end of the strip already held by the pliers and lifted with respect to the supporting plane in correct position on the belt, without the occurence of any mechanical deformation.

The motion of the truck, associated with the pliers, is further guided by virtue of the fact that the truck structure comprises a prolongation 52 provided with a small wheel 53 slideably disposed on a U-shaped track 53'.

The locking device 35 (FIG. 2) is formed by a pair of jaws 54, 55 actuated by a pneumatic piston-cylinder assembly 56 whose stem 56', acting on only one jaw and overcoming the resistance of an appropriate spring (not illustrated), closes the locking device.

The pliers 32 comprise means for displacing the belt towards the supporting member 10 and, vice versa, when the locking device 35 is not gripping the moving belt; owing to this latter feature, which will be explained in detail later on, the pliers are immediately moved upstream or downstream of the cutting means 8 to take up and to lift the reinforcing layers with the magnets from the supporting plate at first one end and then the other end and to deposit them on the belt when the locking device is associated with the belt in motion.

The above indicated means comprise a fluid-dynamic control member having hydraulic cylinder 57, and a piston having a stem 58 (FIGS. 1 and 6), and a positioning element 59. The cylinder 57 is arranged parallel to the driving bar 44 and is connected at one end 60 to the frame 16 with such a direction as to push the stem 58 into a hole 61 of the flange 47 against the surface 62 of the truck 33, causing its movement from the belt 4 towards the cutting member 8 as far as the pliers are above the supporting plate 10 and upstream with respect to the direction of the blade.

The positioning element 59 comprises a pin 63, connected by a lever rotating on a hinge 59' of the frame 16. The rotation of the lever moves the pin from a rest position to abut against the surface 64 of the truck so as to stop the pliers in a lifted position with respect to the supporting plane 10 and downstream of the cutting line (FIG. 1).

Figure 13:
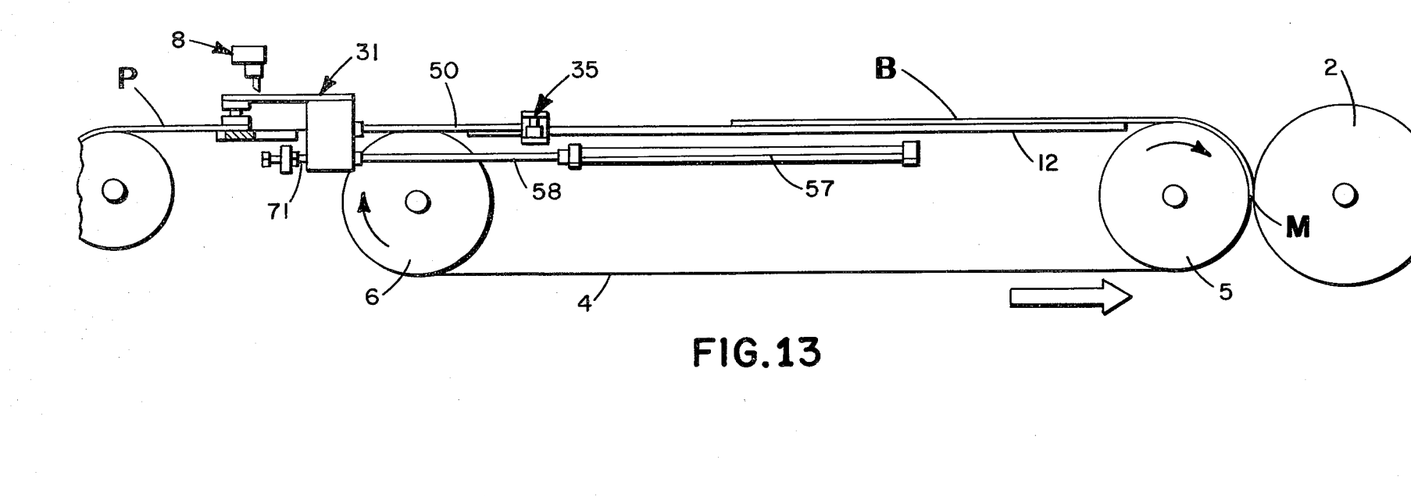

The apparatus 1 comprises further means 65 situated between the drum 2 and the belt 4, which removes the elastomeric strip from the belt and carries out its progressive winding on the revolving drum, which rotates in a sense opposite to the belt motion; means 65 comprise a lever hinged to the shaft 67 of the pulley 5 (FIG. 1), a point element 68 associated to the end of lever 67; a cylinder 69 having a piston whose stem, when necessary pushes the element 68 with the relative pointed member on the belt 4 and under the reinforcing layer in a sense opposite to the belt motion, thus facilitating, at the point of contact and pressure between the belt and the drum (FIG. 13), the detachment of the strip from the belt and its winding on the drum.

The operation of the apparatus will now be described with reference to the initial step represented in FIG. 7, with the end A of a strip already cut along the direction of its cords, there are the pliers 32 with the supporting plate 36 (FIG. 6) and relative magnets gripping the end portion obtained after cutting and having a variable width; in this plane the position of the pliers is determined by the maximum stroke of piston 58 of cylinder 57 and by an appropriate stop 71.

Figure 7:
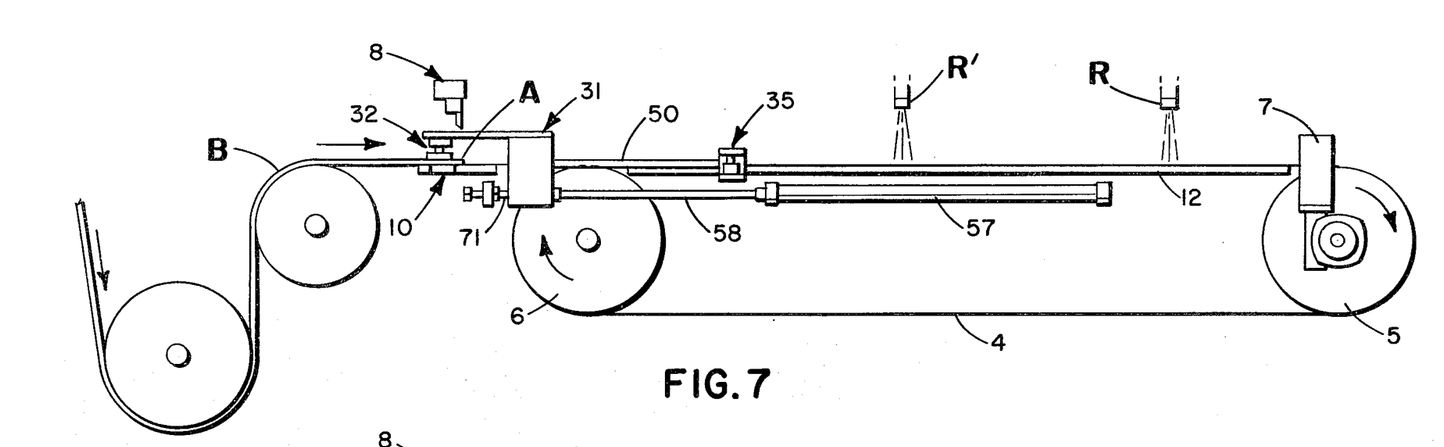
FIGS. 7 to 14 show successive steps of the application of an elastomeric strip on a drum for building-up an annular tire tread reinforcing structure which is to be sandwiched between the carcass and the tread of a pneumatic tire.

The pliers, in the position and condition of FIG. 7, are assembled with the device 35 in idle position, namely with the jaws 54, 55 opened on the belt 4.

In an immediately following step, the magnetic surface 10' is de-magnetized and the cylinder 39 of the pliers 32 is actuated in such a way that the stem 38 (FIG. 6) lifts the supporting plane 36 and, together with it, the end A of strip B, the stem 58 is withdrawn into cylinder 57 and the pliers are brought into contact with the belt 4 which is placed in motion by means of the motor-reducer 7 (FIG. 1). The rigid connection between the pliers and the belt is carried out by actuating pressure cylinder 56 (FIG. 2) so that the piston rod 56' moves the jaws of the locking device 35 towards each other to the closing position on opposite edges of belt 4.

Figure 8:
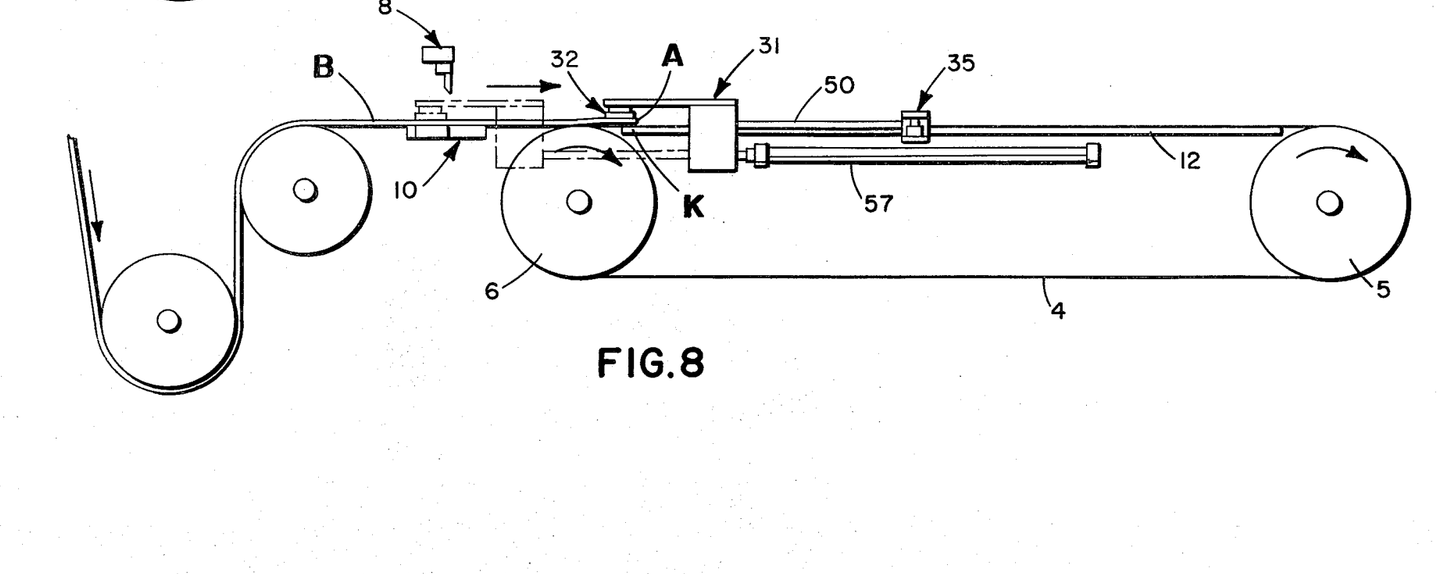

In addition to the described operations, the pliers 32 transport end A of strip B from the position shown in dotted lines in FIG. 8 to that shown by a continuous line in the same Figure, immediately above zone K in which are acting the first permanent magnets 12 situated in a fixed manner under the belt 4 (FIG. 2) in continuous motion.

Immediately afterwards, the belt 4 is stopped and cylinder 39 is actuated in such a manner (FIG. 6) that the piston rod 38 brings again the supporting member 36 and, together with it, the end A of strip B on belt 4; at this moment the cylinders 40 supported on the structure 37 are actuated in succession, so as to rotate at first one lever 42 and then the other, thus causing the inclination of the supporting plane 36 with respect to the belt surface to facilitate the detachment of the magnets of the pliers from the belt, avoiding pulling upward of end A when the rod 38 is again withdrawn into its cylinder.

Figures 4A, 4B:
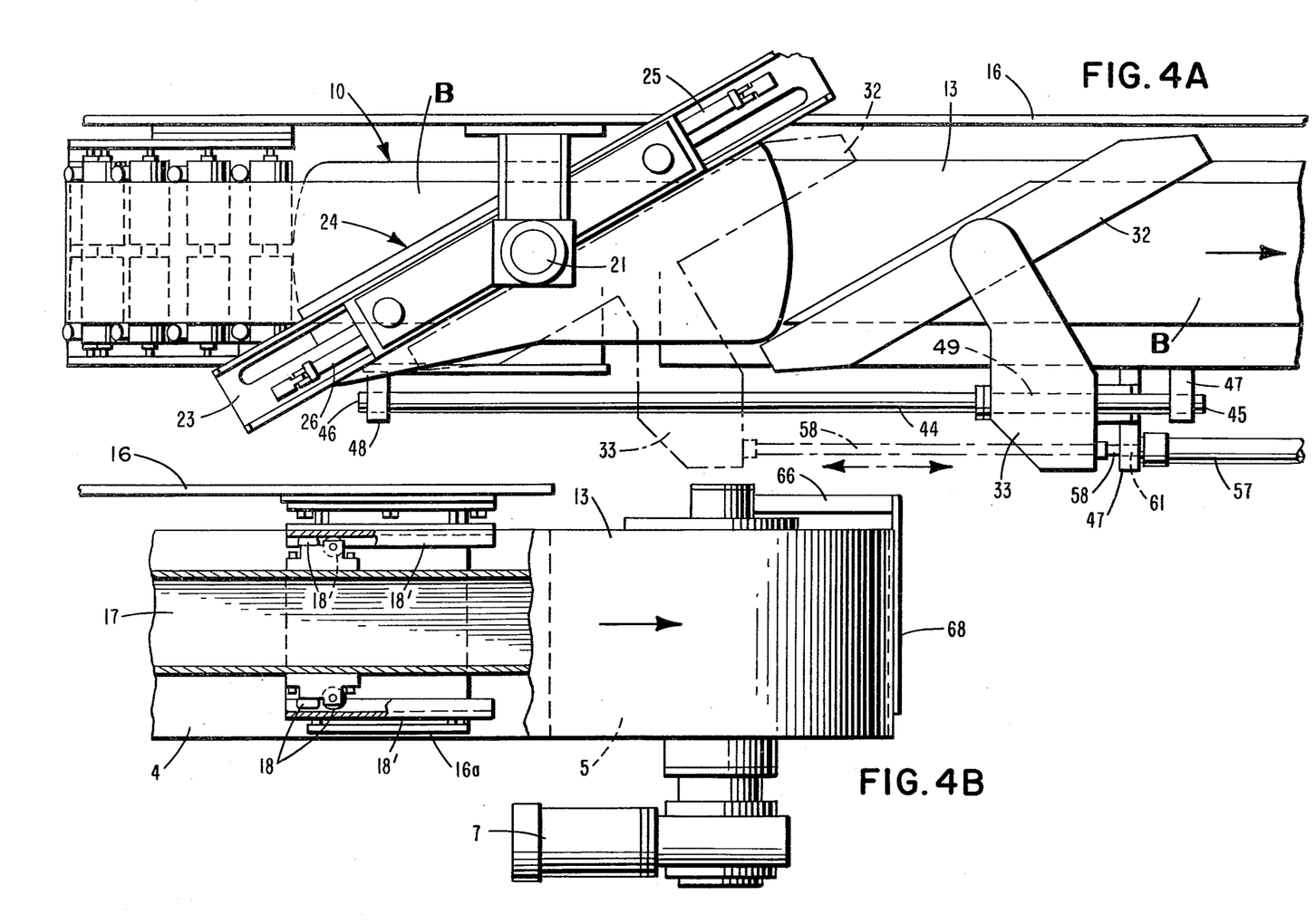
FIGS. 4A and 4B are a plan view of the embodiment of the apparatus illustrated in FIG. 1.

After this step, the end A is drawn by the magnets on the band surface and maintains a pre-established alignment since the pliers have moved along the bar 44 (FIG. 4) at the side of the belt, without suffering any misalignment from the initial position of FIG. 7.

Subsequently, the pliers 32 are controlled to take up and to align the second end of the layer on the band; more precisely; at first, cylinder 56 is actuated in such a way that the jaws 54, 55 of the ledging device (FIG. 2) are no longer gripping the band; then motor 7 (FIG. 1) is actuated to move belt 4 forward and, simultaneously or immediately afterwards, the pliers are brought again towards the supporting surface 10 until the surface 64 of truck 33 (FIG. 1) abuts on pin 63 of the positioning element 59 rotated about hinge 59'.

Figure 9:
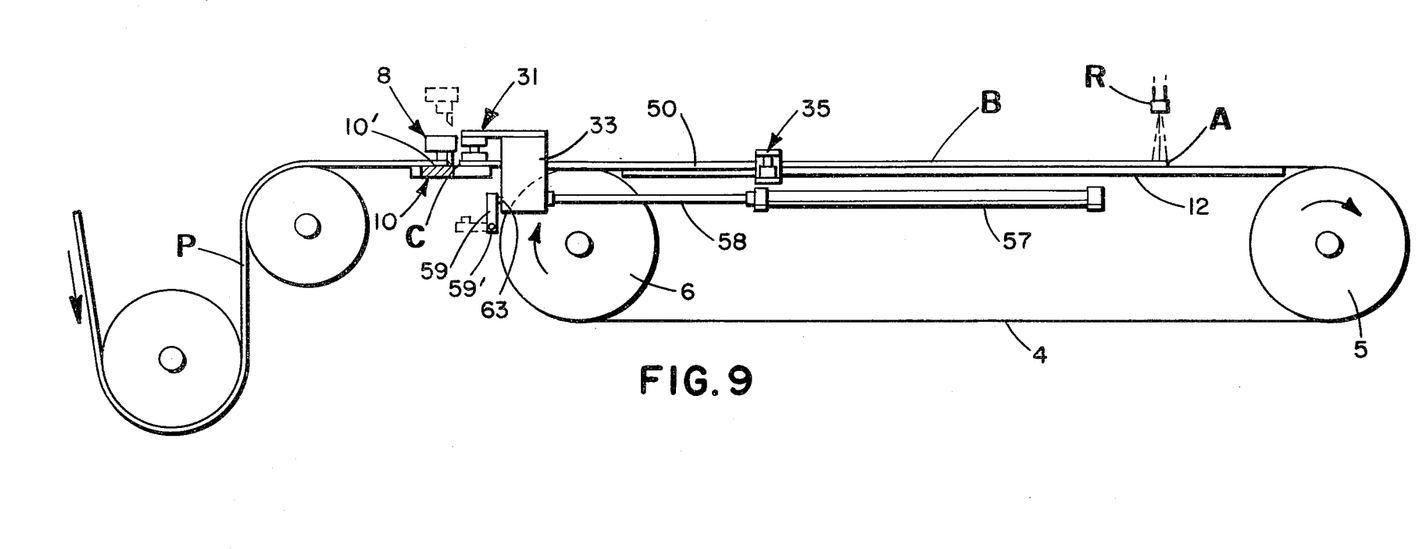
Figure 10:
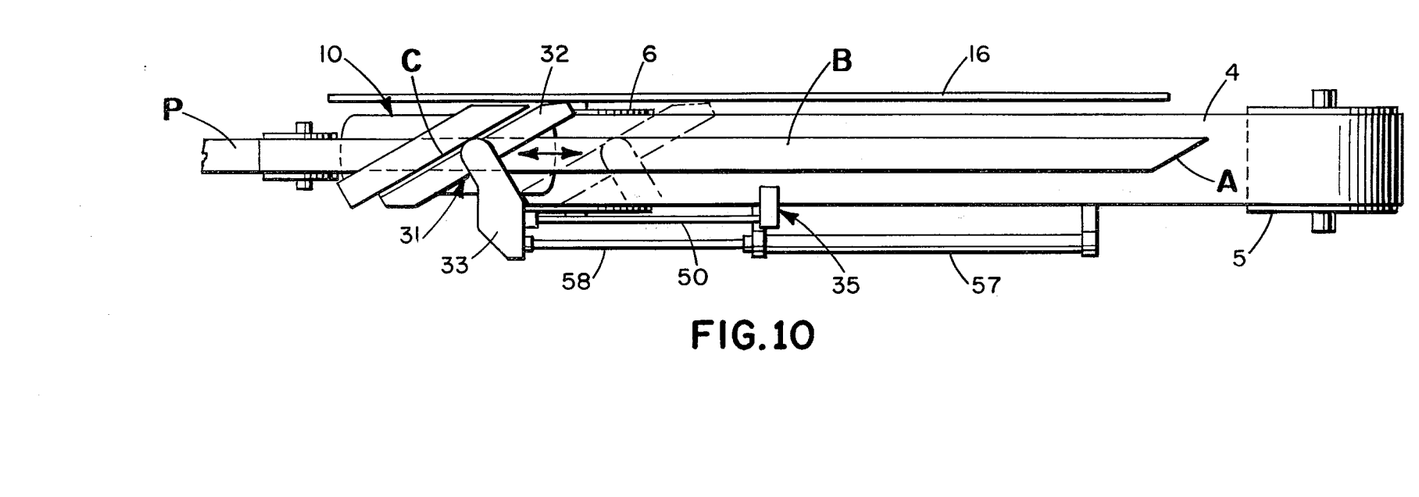

This makes it possible to obtain the conditions represented in FIG. 9, in which the belt is stopped when the end A of the strip is under the reference element R (photoelectric cell or similar device) and the supporting plane 36 is in contact with and above the strip B downstream of the cutting means so as to keep the blocked end to allow the formation of the second end C of the strip by the actuation of cylinders 21, 25, 26 which cause the respective lowering and relative detachment of the blades 29, 30 cutting between two adjacent cords; at the same time cylinders 42" are actuated to bring the magnets 32" (FIG. 6) in a position of magnetic attraction for the new strip P.

Figure 11:
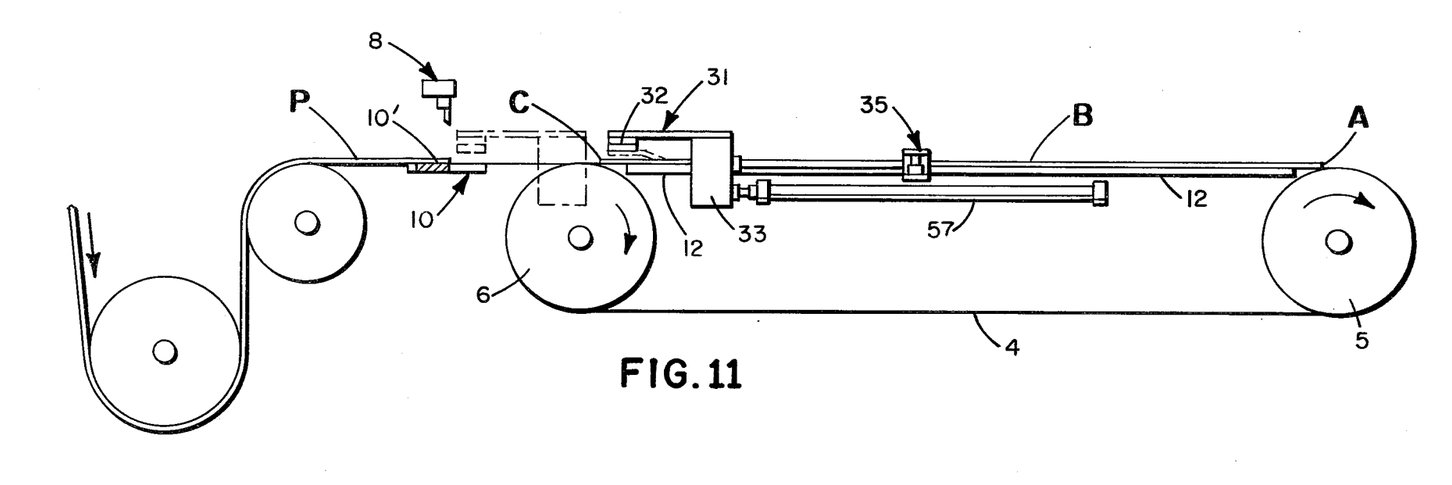

At this point, the pliers 32 are actuated as already done for the initial end A of the strip and, after having associated the locking device 35 to the belt 4 placed into motion, the end C associated to the pliers 32 is brought over the magnets 12, as visible in FIG. 11, and at last the end is laid on the belt which is kept still by the stop of the motor-reducer 7.

Figure 12:
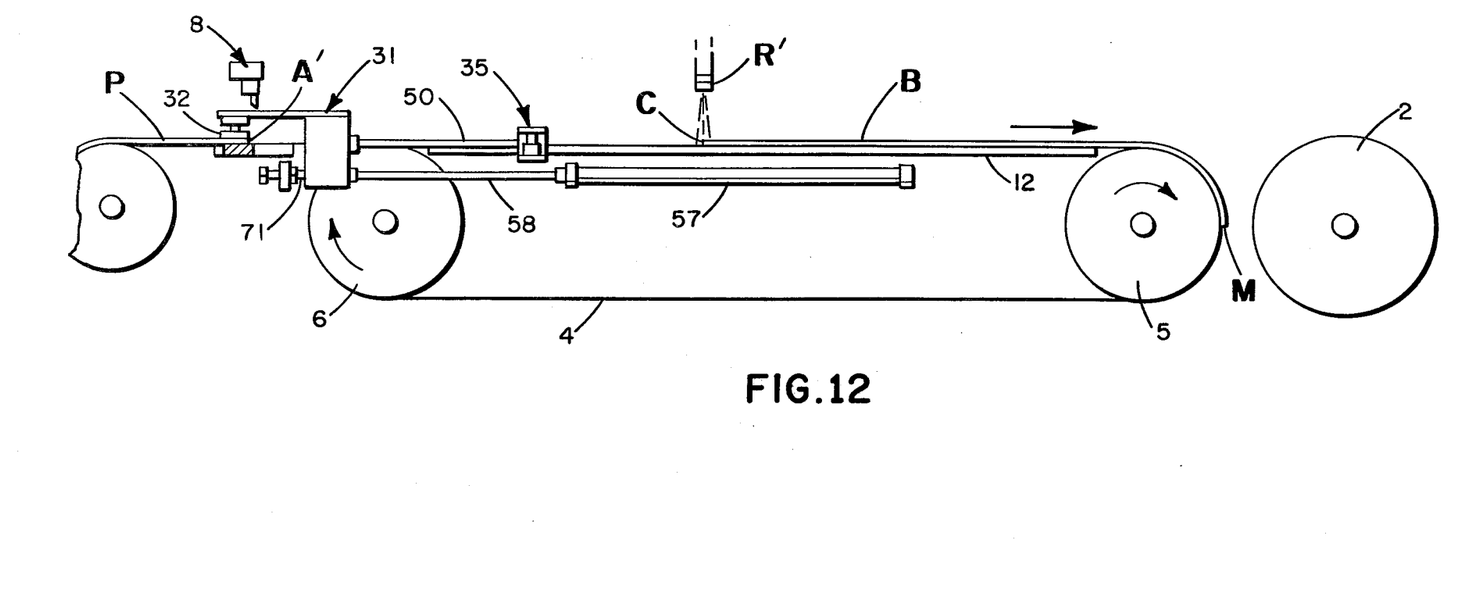

After this operation (FIG. 1), the strip having a length A-C, is entirely laid on the belt 4; a further movement of the belt is carried out until (FIG. 12) the end A of strip is corresponding to point M of pulley 5 where the contact with drum 2 must take place; this time the belt is stopped with a photoelectric cell R' or similar element which senses the presence of end C of the strip.

Simultaneously, the pliers 32, detached from the belt by the opening of the jaws of the locking device 35, are brought again in their initial position at the beginning of the cycle, namely (FIG. 12) upstream of the cutting means, in order to take up a new end A' of strip P as it is progressively paid off automatically from bobbin 3.

Figure 14:
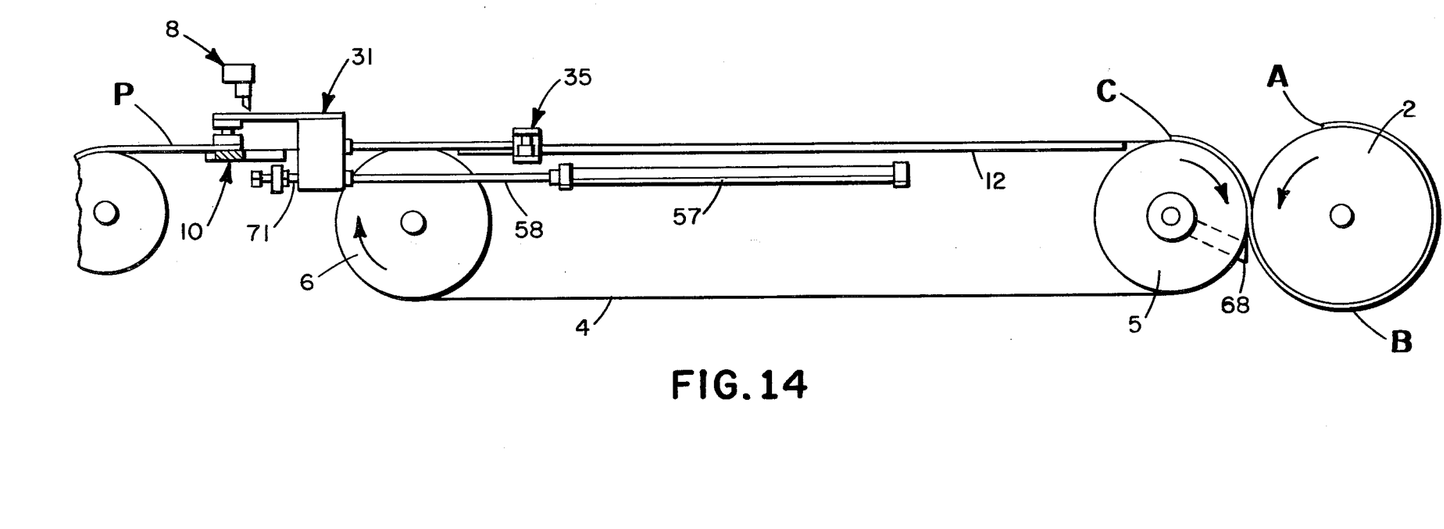

Now the step for transferring strip A-C on the drum is carried out as follows:

At first, the positioning means 9 are actuated by expanding the piston stem 19 in such a way that the U-shaped structure 17 (FIGS. 1 and 2) may slide with respect to the frame 16 until the strip comes into contact with the drum 2 (FIG. 13); then the drum 2 is rotated in a sense opposite to the pulley 5 and the cylinder 69 is actuated (FIG. 1) in such a way that lever 67 brings the pointed element (FIG. 14) into a position for detaching the strip, for its whole length, from the belt 4 and its wound portion on the drum 2 provided on its turn with magnetic inserts to better retain the whole layer on its surface.

At the end of this cycle, the first strip is wound up around drum 2; analogously, according to the already explained method, the second strip is fed from the second bobbin towards the second belt and hence as far as the drum 2, around the first strip.

The above described apparatus offers several advantages, for example, over apparatus in which the cutting means concern in some way the travel of the transporting element.

In fact, in the present case, when the inclination of the cutting means is to be varied according to that of the cords, any intervention is made only on parts of the apparatus which can be easily replaced or modified, since they are situated on flat and fixed surfaces, with very simple angular adjustments of the blades and of the underlying groove.

Moreover, by means of the present apparatus, all the mechanical expedients which would be necessary in transporting elements interfering with the direction of the cutting means are eliminated.

For example, in this apparatus a unique cutting line separates two successive strips paid off from each bobbin from the other; however, the motion of the belt concerns only one strip, while the other remains on the cutting plate. In this way it is not necessary to resort to use of the means of the prior art transporting elements which interfere with the cutting means, to move away the successive strip from the moving belt and then to bring it again on the belt when required.

In fact, in these conventional transporting elements, the absence of the said means would be prejudicial, since the second strip remaining on the moving belt in motion and acting progressively on the signalling elements of the first strip (photoelectric cells and similar elements), would originate erroneous controls also on the first strip.

It is moreover evident that, according to the present invention, it is advantageous to carry out the cutting on a flat surface, so that the ends of the cords, after cutting, do not suffer any lifting or lowering with respect to the strip surface.

Moreover, from the described operation of the apparatus, it is possible to note the advantage of adopting completely automatic steps for the formation of the reinforcing structure by virtue of the presence of the pliers 32 used to lift the ends of the strips and to lay them on the belt.

In addition, although the present invention has been described in a particularly advantageous embodiment, it is to be taken into account that the invention contemplates all the modifications apparent to a technician of this field and derived from the above indicated inventive principles; for instance the stationary magnetic field could be generated by a supply of electric current on electromagnetic circuits and the magnetic field on the pulley with electric current supplied through slip ring and brushes, as in electric motors, for the formation of magnetic fields.

Moreover, the rotation of drum 2 in the winding phase of the strip can be carried out by friction, through the contact with the strip arranged on the belt 4 in motion after having placed drum 2 in idle position.

Alternatively, belt 4 can be disposed a distance slightly greater than the strip thickness; in this case the layer detaches from the belt by means of element 68 and is attracted by appropriate magnets on the surface of drum 2 placed in turn into rotation at the same peripheral speed of the belt and of pulley 5 by virtue of an appropriate mechanism connected to the motor of the pulley.

What is claimed is:

1. An apparatus for automatically feeding transporting strips of elastomeric material having metal cords embedded therein towards a drum which will form an annular reinforcing structure for a tread band of a vehicle pneumatic tire therefrom to be sandwiched between the tire's carcass and the tread band, said apparatus comprising for each of said strips a bobbin having an elastomeric strip wound thereon adapted to form layers of said annular reinforcing structure, a conveyor belt looped around two spaced pulleys one of which is disposed in proximity of said drum in its winding step and cutting means for cutting the elastomeric strip into lengths suitable for layers of said annular reinforcing structure, said apparatus being characterized in that it comprises means for maintaining two distinct and independent magnetic fields adapted to draw and to maintain the strip in pre-established position on the belt surface, said belt being non-magnetic, the first magnetic means being disposed immediately under the belt surface between the two pulleys and being stationary with respect to movement of the belt, and the second magnetic means being disposed on the pulley nearest the drum.

2. The apparatus of claim 1, characterized in that it comprises, between the belt and the bobbin, a flat and stationary supporting structure for supporting the strip, said supporting structure comprising a groove and means for cutting the strip into lengths thereof.

3. The apparatus of claim 1 or 2, comprising means for the automatic and continuous alignment of the ends of the said strip with respect to the belt.

4. The apparatus of claim 3, characterized in that said aligning means comprise pliers provided with means for maintaining a magnetic field for alternately lifting and transporting the two ends of the strip on the belt, a truck fast with pliers, a truck-guiding system to move the pliers with respect to the belt according to a pre-established alignment, a locking device to associate the truck with the pliers to the moving belt, said locking device being disposed downstream of the pliers with respect to the bobbin.

5. The apparatus of claim 4, characterized in that said pliers are associated with permanent magnets.

6. The apparatus of claim 5, characterized in that said means for creating a magnetic field are associated with a supporting member parallel to the belt, and the ends of the supporting member are associated with the opposite and immediately overlying structure, which is permanently connected to the stem of a fluid actuated piston-cylinder fixed to a frame of the apparatus.

7. The apparatus of claim 6, characterized in that opposite surfaces between said supporting structure and said overlying structure are spaced from each other, the ends of said supporting structure and said overlying structure are associated with each other by means of hinge-shaped connecting means, and means are provided for tilting one of the ends of the supporting structure with respect to the other.

8. The apparatus of claim 4, wherein said pliers comprise control means for moving pliers independently of the belt motion.

9. The apparatus of claim 1, comprising means for moving the belt towards the drum, which comprise a fluid actuated piston-cylinder assembly, a longitudinally extended U-shaped structure whose ends are associated with the two pulley of the belt, a plurality of wheels, said fluid actuated piston-cylinder having a stem associated with the frame and a cylinder which is associated with the U-shaped structure.

10. The apparatus of claim 1, wherein the means for maintaining a magnetic field comprises a plurality of permanent magnets arranged under the upper surface of the belt.

11. The apparatus of claim 1, wherein the cutting means comprise two blades, acting in a cutting plane situated upstream of the belt and oriented orthogonally to said cutting plane, the blades being actuated by the stem of a central fluid actuated piston-cylinder assembly for movements towards the cutting plane and each blade being actuated by the stem of a second fluid actuated piston-cylinder assembly acting in the direction of the cords of the layer placed on the belt.

12. An apparatus for transporting strips of elastomeric material having a magnetic responsive metal reinforcement distributed therein to a drum which is adapted to convert the strips into an annular reinforcing structure for disposing between a vehicle tire's tread band and carcass to support the tread band, said apparatus comprising a conveyor having an endless nonmagnetic belt looped around upstream and downstream pulleys with upper and lower reaches and disposed with the downstream pulley facing said drum for transfer of strips carried on the belt to the drum and the upstream pulley is disposed facing a source of elastomeric strip, means for cutting the strip into lengths adjacent the upstream pulley, means disposed between the upper and lower reaches for maintaining a first magnetic field about the upper reach and spaced laterally upstream from the downstream pulley for maintaining the said lengths on the upper reach for movement with the belt, means disposed adjacent to said downstream pulley for maintaining a magnetic field for attracting the strip towards the said drum from the belt as the strip moves around the downstream pulley, means for moving the conveyor alternately towards the said drum and towards the said source of elastomeric strip, and means for rotating the belt with the upper reach moving towards the downstream pulley.

13. The apparatus of claim 12 wherein said downstream pulley has magnets secured thereto for rotation therewith to maintain a magnetic field adjacent to the drum.

* * * * *